United States Patent [19]

Iwaya et al.

[11] Patent Number: 5,084,426
[45] Date of Patent: Jan. 28, 1992

[54] SEMICONDUCTIVE CERAMIC COMPOSITION

[75] Inventors: Shoichi Iwaya; Hitoshi Masumura; Haruo Taguchi; Munemitsu Hamada; Tomohiro Sogabe; Shigeya Takahashi; Hiroyuki Satoh, all of Akita, Japan

[73] Assignee: TDK Corporation, Tokyo, Japan

[21] Appl. No.: 379,420

[22] Filed: Jul. 13, 1989

[30] Foreign Application Priority Data

Jul. 14, 1988 [JP] Japan .................. 63-173979

[51] Int. Cl.$^5$ .................................. C04B 35/46
[52] U.S. Cl. .................. 501/135; 501/139; 501/136; 252/520; 252/521
[58] Field of Search .......... 501/154, 156, 135, 139, 501/136; 252/520, 521

[56] References Cited

U.S. PATENT DOCUMENTS

| | | | |
|---|---|---|---|
| 4,552,853 | 11/1985 | Kawabata et al. | 501/136 |
| 4,582,814 | 4/1986 | Thomas | 501/136 |
| 4,781,859 | 11/1988 | Noi | 501/136 |

FOREIGN PATENT DOCUMENTS 1527060  8/1976  United Kingdom .............. 501/137

Primary Examiner—William R. Dixon, Jr.
Assistant Examiner—C. Melissa Bonner
Attorney, Agent, or Firm—Price, Gess & Ubell

[57] ABSTRACT

A semiconductive ceramic composition capable of permitting its resistance-temperature characteristics and resistance to be controlled as desired and a firing temperature of the composition to be lowered to a degree sufficient to facilitate the mass-production at a low cost. The composition contains a main component consisting of SrO, PbO and TiO$_2$ and is subjected to firing in an oxidizing atmosphere. The composition may contain at least one of SiO$_2$ and M as a minor component. A variation in amount of the main and minor components permits characteristics and properties of the composition to be varied as desired.

10 Claims, 5 Drawing Sheets

SEMICONDUCTIVE CERAMIC COMPOSITION

BACKGROUND OF THE INVENTION

1. Field of the Invention

This invention relates to a semiconductive ceramic composition adapted to be used for a sensor, a functional element such as a current limiter or a rush current restrictor, or the like, and more particularly to a semiconductive ceramic composition which mainly consists of SrO, PbO and $TiO_2$ and exhibits PTC (Positive Temperature Coefficient Thermistor) characteristics having a positive temperature coefficient, NTC (Negative Temperature Coefficient Thermistor) characteristics having a negative temperature coefficient, so-called V-type PTC characteristics having both positive and negative temperature coefficients, CTR (Critical Temperature Resistor) characteristics wherein resistance is abruptly decreased at a certain temperature region, or the like.

2. Description of the Prior Art

A conventional semiconductive ceramic composition having a positive temperature coefficient mainly consists of barium titanate $BaTiO_3$. Such a conventional composition has a high firing temperature when an additive other than an additive for semiconductivity is not added thereto, so that in its specific resistance or resistivity-temperature characteristic curve, resistance rises at a gentle gradient, resulting in failing to have a V-type resistivity-temperature characteristic curve having a negative resistance-temperature coefficient region of a flat shape.

There is also proposed a $PbTiO_3$ composition having an additive for semiconductivity added thereto for the purpose of substituting Sr or Ca for a part of Pb. It is known in the art that firing or burning of the composition in air causes an increase in resistance of the composition, resulting in failing to provide the composition with low resistance required to function as a semiconductor, however, the firing in an argon atmosphere satisfactorily provides the composition with desired low resistance and provides a positive temperature coefficient thermistor of a high curie point. Unfortunately, the composition thus fired in an Ar atmosphere is increased in resistance in normal use in air, resulting in the characteristics being unstable.

A negative temperature coefficient thermistor is mainly formed of transition metals such as Mn, Ni, Co and the like and has a B constant up to about 4000 ($-\alpha$: 4 to 5%), so that it is highly difficult to vary a gradient of a resistivity-temperature characteristic curve over a wide range. Also, it has another disadvantage that adjustment of the resistance leads to a variation of the B constant. In the negative temperature coefficient thermistor, a variation of the resistance with a temperature is not linear in a logarithmic graph showing resistancetemperature characteristics of the semiconductive ceramic composition, accordingly, use of the thermistor requires a circuit to render the variation linear.

Further, the negative temperature coefficient thermistor is progressively decreased in resistance due to its own heat release when an overvoltage is applied thereto, resulting in being broken. In view of the above, an element is proposed which is formed by thermally joining a negative temperature coefficient element used for restricting an inrush current when a power supply is switched on and a positive temperature coefficient element for preventing flowing of an overcurrent when any abnormality together so that V-type temperature characteristics may be exhibited to rapidly carry out both inrush current restriction and overcurrent prevention.

In addition, a critical temperature resistor is mainly formed of $V_2O_5$, basic oxide and the like, resulting in a reduction treatment and a quenching treatment being required to lead to a failure in stable manufacturing of the resistor. Also, the critical temperature resistor is in the form of a bead-like shape and adapted to use a Pt wire or the like as a lead wire, thus, its configuration is subject to restriction to cause its cost to be increased. Also, shifting of a point at which resistance of the resistor is abruptly varied is limited within a range as narrow as 50° to 80° C. Further, a restriction on manufacturing of the critical temperature resistor fails to form it into a bulky shape, so that it may not be used under a high voltage.

The inventors, as a result of research in view of the foregoing, developed a semiconductive ceramic composition which is free of Ba irrespective of having an $ABO_3$ perovskite structure by selecting Sr and Pb on an A site and which further exhibits PTC characteristics of a relatively large negative temperature coefficient (NTC region) without any additive, as disclosed in Japanese Patent Application Laying-Open Publication No. 280401/1988.

SUMMARY OF THE INVENTION

The present invention has been made in view of the foregoing disadvantage of the prior art while, as a result of our research, notice has been taken of the fact that a variation in composition of main and minor components in the above-described composition developed by us provides a semiconductive ceramic composition which permits resistance-temperature characteristics and resistance of the composition to be controlled additionally the a firing temperature of the composition can be lowered and the firing of the composition in an oxidizing atmosphere provides a ceramic of stable characteristics.

Accordingly, it is an object of the present invention to provide a semiconductive ceramic composition which is capable of controlling its resistance-temperature characteristics and/or resistance as desired.

It is another object of the present invention to provide a semiconductive ceramic composition which is capable of significantly lowering its firing temperature.

It is a further object of the present invention to provide a semiconductive ceramic composition which is capable of providing a ceramic of stable characteristics.

It is still another object of the present invention to provide a semiconductive ceramic composition which is capable of possessing NTC characteristics, V-type PTC characteristics, PTC characteristics or CTR characteristics as desired.

It is yet another object of the present invention to provide a semiconductive ceramic composition which is capable of permitting its NTC characteristics, V-type PTC characteristics, PTC characteristics or CTR characteristics to be varied as desired.

It is even another object of the present invention to provide a semiconductive ceramic composition which is capable of exhibiting various resistance-temperature characteristics and varying the characteristics over a wide range.

It is still a further object of the present invention to provide a semiconductive ceramic composition which is capable of rapidly and positively exhibiting V-type characteristics.

It is yet a further object of the present invention to provide a semiconductive ceramic composition which is capable of being readily manufactured.

It is even a further object of the present invention to provide a semiconductive ceramic composition which is capable of being formed into various sizes and/or configurations.

In accordance with the present invention, a semiconductive ceramic composition is provided. The composition comprises Sr of 0.05 to 0.95 mol based on SrO, Pb of 0.05 to 0.85 mol based on PbO, Ti of 0.90 to 2.0 mol based on $TiO_2$ and R of 0.001 to 0.3 mol based on its oxide. R is at least one material selected from the group consisting of rare earth elements, Bi, V, W, Ta, Nb and Sb. The amounts of rare earth elements except Ce, Bi and Sb are based on $\frac{1}{2}(R_2O_3)$, the amounts of V, Ta and Nb are based on $\frac{1}{2}(R_2O_5)$ and the amounts of Ce and W are based on $RO_2$ and $RO_3$, respectively. The composition is subjected to firing in an oxidizing atmosphere.

The semiconductive ceramic composition of the present invention may further comprise $SiO_2$ added in an amount of 0.001 to 30 wt%.

The composition of the present invention may further comprise M added thereto, which is at least one material selected from the group consisting of Mn, Cu, Cr, Ni, Fe, Co, Ru, Os, Ge, Hf, P, Sb, V, Mg, Zn, W, Al, Mo, In, Ga, Nb, Ta, Bi, Sc, rare earth elements, Th, Na, K, Li, B, Ag, Cs and Rb. M is added in amounts of 0.00001 to 1.2 wt% except Al and W, and Al and W is added in amounts of 0.00001 to 8 wt%.

$SiO_2$ and M may be added together to the composition.

In the present invention, SrO and PbO are replaced in amounts of 0.001 to 0.3 mol with at least one of BaO and CaO.

The semiconductive ceramic composition of the present invention which contains SrO, PbO and $TiO_2$ as its main component as described above provides a ceramic having PTC characteristics, V-type PTC characteristics, NTC characteristics, or CTR characteristics as desired. An increase in $TiO_2$ permits specific resistance or resistivity of the composition to be controlled from a low level to a high level without significantly varying a gradient of resistance-temperature characteristics, resulting in providing a ceramic element which is capable of meeting any resistance requirements. $SiO_2$ contributes to lowering of a temperature at which the composition starts to possess semiconductivity (hereinafter referred to as "semiconductivity starting temperature") and changes characteristics of the composition from V-type PTC characteristics to characteristics approaching to CTR characteristics. Addition of M enhances PTC characteristics and NTC characteristics. Also, substitution of BaO and CaO for a part of SrO and PbO enhances PTC characteristics and permits a particle size of the composition fired or sintered to be uniform. Further, concurrent or combined addition of additives exhibiting different functions to the composition provides it with features of the respective additives.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Figure 1:
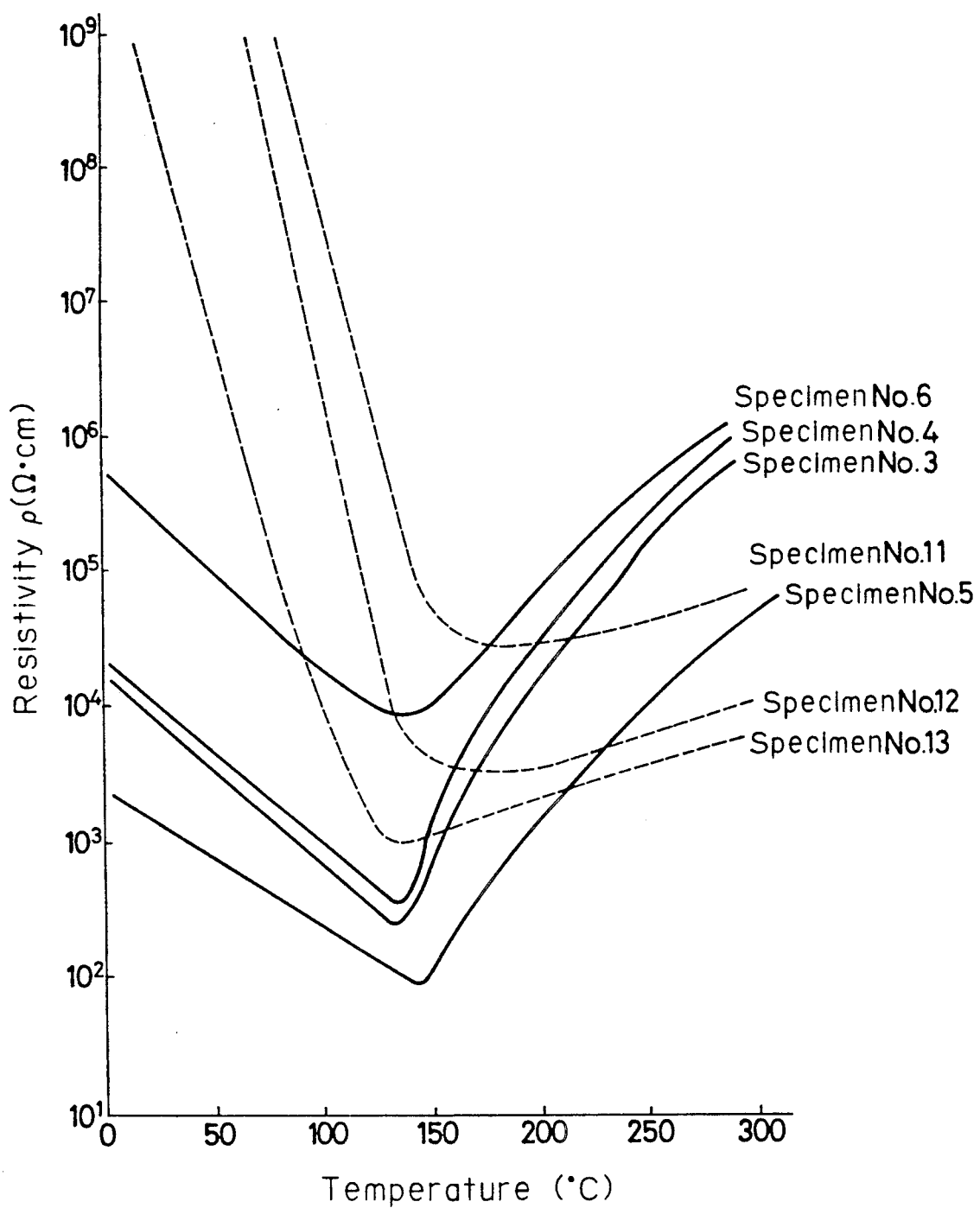
FIGS. 1 to 5 each are a graphical representation showing a resistivity-temperature characteristic curves of a semiconductive ceramic composition according to the present invention.

Now, a semiconductive ceramic composition according to the present invention will be described hereinafter with reference to the following example.

Example

Starting materials for various semiconductive ceramic compositions were selected from $SrCO_3$, PbO, $Y_2O_3$, $TiO_2$, $CaCO_3$, $La_2O_3$, $CeO_2$, $Nd_2O_5$, $Sm_2O_3$, $Dy_2O_3$, $Gd_2O_3$, $V_2O_3$, $Bi_2O_3$, $WO_3$, $Ta_2O_5$, $Nb_2O_5$, $Sb_2O_3$, $MnCO_3$, CuO, $Cu_2O_3$, $Cr_2O_3$, $Li_2CO_3$, $Th_2O_3$, $Sc_2O_3$, $Fe(NO_3)_3$, $Al_2O_3$, $P_2O_5$, CoO, $BaCO_3$, ZnO, $MgCO_3$, $B_2O_3$, NiO, $Na_2O$, Ga, In, Tl, $Rb_2O$, $Ca_2O$, Ag, $Ru_2O_3$, $Os_2O_3$, Ge, 2, $MoO_3$ and $K_2O$ and weighed to prepare semiconductive ceramic compositions shown in TABLES 1 to 6. The amounts of minor components M shown in the tables were based on their elements. The selected and weighed materials were then placed in a polyethylene pot mill charged with agate beads and subjected to wet mixing for 20 hours, resulting in being powdered. Then, each of the soobtained powder materials was subjected to hydration and drying followed by calcination at a temperature of 800° to 1100° C. for 2 hours.

The material calcined was coarsely grained and then water-ground for about 20 hours in the pot mill described above, followed by dehydration and drying.

Subsequently, polyvinyl alcohol (PVA) was added to the dried material to lead to granulation of the material, which was then subjected to shaping at a pressure of about 2 ton/cm² by means of a hydraulic pressing machine, resulting in a disc of 16.5 mm in diameter and 3.5 mm in thickness. The so-formed disc was then subjected to firing or burning for 2 hours at a temperature of 1150° to 1300° C. in a batch oven of an oxidizing atmosphere, resulting in each of the semiconductive ceramic composition being obtained in the form of a disc-like shape having dimensions of 14 mm in diameter and 2.5 mm in thickness.

The so-prepared semiconductive ceramic composition specimens each were formed on both surfaces thereof with electrodes of In-Ga alloy, so that specific resistance or resistivity at 20° C., minimum resistivity and resistance-temperature characteristics were measured with respect to each specimen.

The results were as shown in TABLES 1 to 6 and FIGS. 1 to 5. In the tables, specimens with which an asterisk (*) is marked are not included in the scope of the present invention. A temperature coefficient $\alpha$ is indicated by the following equation:

$$\alpha = \frac{\log R_2/R_1}{T_2 - T_1} \times 100 \, (\%/°C.)$$

Also, a curie point Tc indicates a temperature at an intersection of extensions from linear sections on both sides of an inflection point.

TABLE 1

| Specimen No. | Main Components Molar Ratio of Each Component | | | | Specific Resistance $\Omega$-cm | | Temperature Coefficient %/°C. | | Curie Point °C. |
|---|---|---|---|---|---|---|---|---|---|
| | SrO | PbO | ½($Y_2O_3$) | $TiO_2$ | $\rho_{20}$ (at 20°C.) | $\rho_{min}$ (minimum) | $-\alpha$ | $\alpha$ | $T_c$ |
| *1 | 0.497 | 0.497 | 0.006 | 0.88 | $>10^9$ | $>10^9$ | — | — | — |
| 2 | 0.497 | 0.497 | 0.006 | 0.90 | $2.0 \times 10^7$ | $1.1 \times 10^6$ | 3.19 | 5.00 | 120 |
| 3 | 0.497 | 0.497 | 0.006 | 0.95 | $1 \times 10^4$ | $2.9 \times 10^2$ | 3.50 | 6.4 | 130 |
| 4 | 0.497 | 0.497 | 0.006 | 1.00 | $1.1 \times 10^4$ | $3.7 \times 10^2$ | 3.14 | 7.5 | 136 |
| 5 | 0.497 | 0.497 | 0.006 | 1.2 | $1.2 \times 10^3$ | $9 \times 10^1$ | 3.05 | 4.5 | 142 |
| 6 | 0.497 | 0.497 | 0.006 | 1.5 | $2.6 \times 10^5$ | $9 \times 10^4$ | 3.14 | 4.1 | 140 |
| 7 | 0.497 | 0.497 | 0.006 | 1.0 | $3.8 \times 10^7$ | $2.2 \times 10^5$ | 2.97 | 4.10 | 160 |
| *8 | 0.497 | 0.497 | 0.006 | 2.3 | $>10^9$ | $>10^9$ | — | — | — |
| *9 | 0.485 | 0.485 | 0.03 | 0.88 | $>10^9$ | $>10^9$ | — | — | — |
| 10 | 0.485 | 0.485 | 0.03 | 0.90 | $>10^9$ | $5 \times 10^5$ | 14.2 | 1.20 | 145 |
| 11 | 0.485 | 0.485 | 0.03 | 0.95 | $>10^9$ | $3 \times 10^4$ | 13.8 | 0.10 | 154 |
| 12 | 0.485 | 0.485 | 0.03 | 1.00 | $>10^9$ | $3.2 \times 10^3$ | 13.8 | 1.21 | 142 |
| 13 | 0.485 | 0.485 | 0.03 | 1.2 | $1 \times 10^9$ | $1.0 \times 10^3$ | 11.2 | 1.31 | 130 |
| 14 | 0.485 | 0.485 | 0.03 | 1.5 | $>10^9$ | $2 \times 10^4$ | 12.8 | 1.05 | 135 |
| 15 | 0.485 | 0.485 | 0.03 | 2.0 | $>10^9$ | $5 \times 10^5$ | 13.3 | 1.12 | 135 |
| *16 | 0.485 | 0.485 | 0.03 | 2.3 | $>10^9$ | $>10^9$ | — | — | — |
| *17 | 0.4998 | 0.4998 | 0.0005 | 1.00 | $>10^9$ | $>10^9$ | — | — | — |
| 18 | 0.4995 | 0.4995 | 0.001 | 1.00 | $1.2 \times 10^5$ | $5.1 \times 10^3$ | 2.21 | 7.1 | 135 |
| 19 | 0.497 | 0.497 | 0.006 | 1.00 | $1.1 \times 10^4$ | $3.7 \times 10^2$ | 3.14 | 7.5 | 136 |
| 20 | 0.495 | 0.495 | 0.01 | 1.00 | $1 \times 10^6$ | $2.5 \times 10^2$ | 8.0 | 1.8 | 135 |
| 21 | 0.485 | 0.485 | 0.03 | 1.00 | $>10^9$ | $3.2 \times 10^3$ | 13.8 | 1.21 | 142 |
| 22 | 0.45 | 0.45 | 0.10 | 1.00 | $>10^9$ | $5.4 \times 10^3$ | 15.0 | 1.10 | 138 |
| 23 | 0.35 | 0.35 | 0.30 | 1.00 | $>10^9$ | $6 \times 10^5$ | 18.2 | 1.03 | 132 |
| *24 | 0.325 | 0.325 | 0.35 | 1.00 | $>10^9$ | $>10^9$ | — | — | — |
| *25 | 0.4998 | 0.4998 | 0.0005 | 0.95 | $>10^9$ | $>10^9$ | — | — | — |
| 26 | 0.4995 | 0.4995 | 0.001 | 0.95 | $5 \times 10^6$ | $3.5 \times 10^4$ | 3.12 | 5.7 | 132 |
| 27 | 0.497 | 0.497 | 0.006 | 0.95 | $1 \times 10^4$ | $2.4 \times 10^2$ | 3.50 | 6.4 | 130 |
| 28 | 0.485 | 0.485 | 0.03 | 0.95 | $>10^9$ | $3 \times 10^4$ | 13.8 | 1.10 | 154 |
| 29 | 0.35 | 0.357 | 0.30 | 0.95 | $>10^9$ | $7 \times 10^6$ | 13.5 | 1.05 | 145 |
| *30 | 0.325 | 0.325 | 0.35 | 0.95 | $>10^9$ | $>10^9$ | — | — | — |
| *31 | 0.4998 | 0.4992 | 0.0005 | 1.2 | $>10^9$ | $>10^9$ | — | — | — |
| 32 | 0.4995 | 0.4995 | 0.001 | 1.2 | $5.6 \times 10^5$ | $3.2 \times 10^3$ | 2.65 | 3.9 | 141 |
| 33 | 0.497 | 0.497 | 0.006 | 1.2 | $1.2 \times 10^3$ | $9 \times 10^1$ | 3.05 | 4.5 | 142 |
| 34 | 0.485 | 0.485 | 0.03 | 1.2 | $1 \times 10^9$ | $1 \times 10^3$ | 11.2 | 1.31 | 130 |
| 35 | 0.35 | 0.35 | 0.30 | 1.2 | $>10^9$ | $5 \times 10^5$ | 12.6 | 1.14 | 135 |
| *36 | 0.325 | 0.325 | 0.35 | 1.2 | $>10^9$ | $>10^9$ | — | — | — |
| *37 | 0.094 | 0.90 | 0.006 | 1.00 | $>10^9$ | $>10^9$ | — | — | — |
| 38 | 0.144 | 0.85 | 0.006 | 1.00 | $>10^9$ | $3.2 \times 10^5$ | 3.34 | 7.2 | 380 |
| 39 | 0.394 | 0.60 | 0.006 | 1.00 | $2.2 \times 10^5$ | $2.1 \times 10^2$ | 4.06 | 5.5 | 200 |
| 40 | 0.497 | 0.497 | 0.006 | 1.00 | $1.1 \times 10^4$ | $3.7 \times 10^2$ | 3.14 | 7.5 | 136 |
| 41 | 0.597 | 0.40 | 0.006 | 1.00 | $3.5 \times 10^3$ | $1.1 \times 10^2$ | 3.43 | 5.3 | 78 |
| 42 | 0.944 | 0.05 | 0.006 | 1.00 | — | $5.6 \times 10^5$ | 3.33 | 6.0 | 122 |
| *43 | 0.964 | 0.03 | 0.006 | 1.00 | $>10^9$ | $>10^9$ | — | — | — |
| *44 | 0.094 | 0.90 | 0.006 | 0.95 | $>10^9$ | $>10^9$ | — | — | — |
| 45 | 0.144 | 0.85 | 0.006 | 0.95 | $>10^9$ | $5.4 \times 10^5$ | 3.60 | 7.2 | 378 |
| 46 | 0.497 | 0.497 | 0.006 | 0.95 | $1 \times 10^4$ | $2.4 \times 10^2$ | 3.50 | 6.4 | 130 |
| 47 | 0.944 | 0.05 | 0.006 | 0.95 | — | $3 \times 10^2$ | 3.4 | 6.0 | $-103$ |
| *48 | 0.964 | 0.03 | 0.006 | 0.95 | $>10^9$ | $>10^9$ | — | — | — |
| *49 | 0.094 | 0.90 | 0.006 | 1.2 | $>10^9$ | $>10^9$ | — | — | — |
| 50 | 0.144 | 0.85 | 0.006 | 1.2 | $>10^9$ | $1 \times 10^5$ | 3.32 | 5.2 | 377 |
| 51 | 0.497 | 0.497 | 0.006 | 1.2 | $1.2 \times 10^3$ | $9 \times 10^1$ | 3.12 | 4.5 | $-90$ |
| 52 | 0.944 | 0.05 | 0.006 | 1.2 | — | $8 \times 10^{11}$ | — | 5.5 | — |
| *53 | 0.964 | 0.03 | 0.006 | 1.2 | $>10^9$ | $>10^9$ | — | — | — |
| *54 | 0.07 | 0.90 | 0.03 | 1.00 | $>10^9$ | $>10^9$ | — | — | — |
| 55 | 0.12 | 0.85 | 0.03 | 1.00 | $>10^9$ | $4 \times 10^6$ | 12.8 | 1.33 | 380 |
| 56 | 0.394 | 0.60 | 0.03 | 1.00 | $>10^9$ | $3 \times 10^5$ | 14.3 | 1.12 | 220 |
| 57 | 0.497 | 0.497 | 0.03 | 1.00 | $>10^9$ | $3.2 \times 10^3$ | 13.8 | 1.21 | 142 |
| 58 | 0.597 | 0.40 | 0.03 | 1.00 | $1 \times 10^8$ | $1.2 \times 10^3$ | 15.2 | 1.10 | 80 |
| 59 | 0.944 | 0.05 | 0.03 | 1.00 | — | $5.9 \times 10^5$ | 13.7 | 1.08 | $-130$ |
| *60 | 0.964 | 0.03 | 0.03 | 1.00 | $>10^9$ | $>10^9$ | — | — | — |
| *61 | 0.094 | 0.90 | 0.03 | 0.95 | $>10^9$ | $>10^9$ | — | — | — |
| 62 | 0.144 | 0.85 | 0.03 | 0.95 | $>10^9$ | $4 \times 10^5$ | 12.9 | 1.05 | 380 |
| 63 | 0.497 | 0.497 | 0.03 | 0.95 | $>10^9$ | $3 \times 10^4$ | 13.8 | 1.10 | 154 |
| 64 | 0.944 | 0.005 | 0.03 | 0.95 | — | $2 \times 10^5$ | 11.5 | 1.15 | $-128$ |
| 65 | 0.964 | 0.03 | 0.03 | 0.95 | $>10^9$ | $>10^9$ | — | — | — |
| *66 | 0.07 | 0.90 | 0.03 | 0.95 | $>10^9$ | $>10^9$ | — | — | — |
| 67 | 0.12 | 0.85 | 0.03 | 1.2 | $>10^9$ | $3 \times 10^5$ | 10.5 | 1.10 | 381 |
| 68 | 0.497 | 0.497 | 0.03 | 1.2 | $1 \times 10^9$ | $1 \times 10^3$ | 11.2 | 1.31 | 130 |
| 69 | 0.944 | 0.05 | 0.03 | 1.2 | — | $5 \times 10^5$ | 12.8 | 1.18 | $-130$ |
| 70 | 0.964 | 0.03 | 0.03 | 1.2 | $>10^9$ | $>10^9$ | — | — | — |
| 71 | 0.497 | 0.497 | ½($La_2O_3$) 0.006 | 0.95 | $1.2 \times 10^4$ | $3.2 \times 10^2$ | 3.48 | 6.2 | 131 |
| 72 | 0.497 | 0.497 | ½($Nd_2O_3$) 0.006 | 0.95 | $3.6 \times 10^4$ | $1.1 \times 10^2$ | 3.56 | 6.4 | 130 |
| 73 | 0.497 | 0.497 | ½($Dy_2O_3$) 0.006 | 0.95 | $1 \times 10^4$ | $2.6 \times 10^2$ | 3.20 | 6.3 | 131 |
| 74 | 0.497 | 0.497 | ½($Sm_2O_3$) | 0.95 | $2 \times 10^4$ | $1.2 \times 10^2$ | 3.18 | 6.2 | 132 |

TABLE 1-continued

| Specimen No. | Main Components Molar Ratio of Each Component | | | | Specific Resistance Ω-cm | | Temperature Coefficient %/°C | | Curie Point °C |
|---|---|---|---|---|---|---|---|---|---|
| | SrO | PbO | ½(Y$_2$O$_3$) | TiO$_2$ | $\rho_{20}$ (at 20° C.) | $\rho_{min}$ (minimum) | $-\alpha$ | $\alpha$ | Tc |
| 75 | 0.497 | 0.497 | ½(Ta$_2$O$_5$) 0.006 | 0.95 | $5.6 \times 10^4$ | $9.8 \times 10^1$ | 3.57 | 6.6 | 130 |
| 76 | 0.497 | 0.497 | ½(Sb$_2$O$_3$) 0.006 | 0.95 | $3.7 \times 10^4$ | $5.6 \times 10^2$ | 3.28 | 6.5 | 133 |
| 77 | 0.497 | 0.497 | WO$_3$ 0.006 | 1.2 | $1.2 \times 10^3$ | $1 \times 10^2$ | 3.04 | 4.3 | 140 |
| 78 | 0.497 | 0.497 | ½(Bi$_2$O$_3$) 0.006 | 1.2 | $1.3 \times 10^3$ | $9 \times 10^1$ | 3.21 | 4.6 | 141 |
| 79 | 0.497 | 0.497 | ½(V$_2$O$_5$) 0.006 | 1.2 | $1.1 \times 10^3$ | $1.3 \times 10^2$ | 3.02 | 4.5 | 144 |
| 80 | 0.497 | 0.497 | ½(Nb$_2$O$_5$) 0.006 | 1.2 | $1.3 \times 10^3$ | $1.9 \times 10^1$ | 3.32 | 4.4 | 142 |
| 81 | 0.497 | 0.497 | ½(Gd$_2$O$_3$) 0.006 | 1.2 | $1.1 \times 10^3$ | $2.1 \times 10^1$ | 3.01 | 4.5 | 141 |

TABLE 2

| Specimen No. | Main Components Molar Ratio of Each Component | | | | Minor Components wt. % | Specific Resistance Ω-cm | | Temperature Coefficient %/°C. | | ST* °C. |
|---|---|---|---|---|---|---|---|---|---|---|
| | SrO | PbO | ½(Y$_2$O$_3$) | TiO$_2$ | SiO$_2$ | $\rho_{20}$ (at 20° C.) | $\rho_{min}$ (minimum) | $-\alpha$ | $\alpha$ | |
| *1 | 0.497 | 0.497 | 0.006 | 1.000 | 0 | $1.1 \times 10^4$ | $3.7 \times 10^2$ | 3.14 | 7.5 | 1200 |
| *2 | 0.497 | 0.497 | 0.006 | 1.000 | 0.0005 | $1.1 \times 10^4$ | $3.7 \times 10^2$ | 3.14 | 7.5 | 1200 |
| 3 | 0.497 | 0.497 | 0.006 | 1.000 | 0.001 | $1.2 \times 10^4$ | $3.4 \times 10^2$ | 3.15 | 7.2 | 1180 |
| 4 | 0.497 | 0.497 | 0.006 | 1.000 | 0.1 | $1.6 \times 10^4$ | $3.3 \times 10^3$ | 3.33 | 7.2 | 1160 |
| 5 | 0.497 | 0.497 | 0.006 | 1.000 | 0.4 | $1.2 \times 10^4$ | $3.4 \times 10^2$ | 3.34 | 7.1 | 1160 |
| 6 | 0.497 | 0.497 | 0.006 | 1.000 | 2.0 | $8.4 \times 10^7$ | $1.1 \times 10^5$ | 35.6 | 0 | 1160 |
| 7 | 0.497 | 0.497 | 0.006 | 1.000 | 5.0 | $>10^9$ | $7.0 \times 10^3$ | 26.8 | 0 | 1150 |
| 8 | 0.497 | 0.497 | 0.006 | 1.000 | 15.0 | $>10^9$ | $4.6 \times 10^3$ | 22.0 | 0 | 1150 |
| 9 | 0.497 | 0.497 | 0.006 | 1.000 | 30.0 | $5 \times 10^8$ | $8.0 \times 10^3$ | 15.0 | 0 | 1150 |
| *10 | 0.497 | 0.497 | 0.006 | 1.000 | 35.0 | melt | — | — | — | — |
| *11 | 0.485 | 0.485 | 0.030 | 1.00 | 0 | $>10^9$ | $3.2 \times 10^3$ | 13.8 | 1.21 | 1200 |
| *12 | 0.485 | 0.485 | 0.030 | 1.00 | 0.0005 | $>10^9$ | $3.2 \times 10^3$ | 13.8 | 1.21 | 1200 |
| 13 | 0.485 | 0.485 | 0.030 | 1.00 | 0.001 | $>10^9$ | $1 \times 10^3$ | 13.6 | 1.20 | 1180 |
| 14 | 0.485 | 0.485 | 0.030 | 1.00 | 0.1 | $>19^9$ | $6.6 \times 10^4$ | 10.5 | 1.70 | 1180 |
| 15 | 0.485 | 0.485 | 0.030 | 1.00 | 0.4 | $4 \times 10^8$ | $6.0 \times 10^4$ | 8.7 | 1.20 | 1160 |
| 16 | 0.485 | 0.485 | 0.030 | 1.00 | 2.0 | $1.1 \times 10^9$ | $6.0 \times 10^4$ | 8.9 | 1.15 | 1160 |
| 17 | 0.485 | 0.485 | 0.030 | 1.00 | 5.0 | $>10^9$ | $1.7 \times 10^3$ | 21.0 | 0 | 1150 |
| 18 | 0.485 | 0.485 | 0.030 | 1.00 | 15.0 | $>10^9$ | $1.7 \times 10^3$ | 16.1 | 0 | 1150 |
| 19 | 0.485 | 0.485 | 0.030 | 1.00 | 30.0 | $>10^9$ | $2.3 \times 10^4$ | 11.5 | 0 | 1150 |
| *20 | 0.485 | 0.485 | 0.030 | 1.00 | 35.0 | melt | — | — | — | — |

ST* ... Semiconductivity starting temperature

TABLE 3

| Specimen No. | Main Components Molar Ratio of Each Component | | | | Minor Component wt % | | Specific Resistance Ω-cm | | Temperature Coefficient %/°C. | |
|---|---|---|---|---|---|---|---|---|---|---|
| | SrO | PbO | ½(Y$_2$O$_3$) | TiO$_2$ | M | | $\rho_{20}$ (at 20° C.) | $\rho_{min}$ (minimum) | $-\alpha$ | $\alpha$ |
| *1 | 0.497 | 0.497 | 0.006 | 1.00 | Mn/O | | $1.1 \times 10^4$ | $3.7 \times 10^2$ | 3.14 | 7.5 |
| 2 | 0.497 | 0.497 | 0.006 | 1.00 | | 0.000005 | $1.1 \times 10^4$ | $3.4 \times 10^2$ | 3.14 | 7.5 |
| 3 | 0.497 | 0.497 | 0.006 | 1.00 | | 0.00001 | $4.3 \times 10^4$ | $9.3 \times 10^2$ | 3.15 | 18.6 |
| 4 | 0.497 | 0.497 | 0.006 | 1.00 | | 0.01 | $1.9 \times 10^4$ | $2.2 \times 10^3$ | 1.62 | 25.9 |
| 5 | 0.497 | 0.497 | 0.006 | 1.00 | | 0.10 | $2.8 \times 10^5$ | $1.1 \times 10^4$ | 2.80 | 16.7 |
| 6 | 0.497 | 0.497 | 0.006 | 1.00 | | 1.2 | $1.8 \times 10^8$ | $3.6 \times 10^5$ | 3.00 | 11.5 |
| *7 | 0.497 | 0.497 | 0.006 | 1.00 | | 1.5 | $>10^9$ | $>10^9$ | — | — |
| *8 | 0.485 | 0.485 | 0.03 | 1.00 | Mn/O | | $>10^9$ | $3.2 \times 10^3$ | 13.8 | 1.21 |
| *9 | 0.485 | 0.485 | 0.03 | 1.00 | | 0.000005 | $>10^9$ | $3.2 \times 10^3$ | 13.8 | 1.21 |
| 10 | 0.485 | 0.485 | 0.03 | 1.00 | | 0.00001 | $>10^9$ | $5.6 \times 10^3$ | 13.6 | 4.5 |
| 11 | 0.485 | 0.485 | 0.03 | 1.00 | | 0.01 | $>10^9$ | $4.5 \times 10^3$ | 13.5 | 12.6 |
| 12 | 0.485 | 0.485 | 0.03 | 1.00 | | 1.2 | $>10^9$ | $4.2 \times 10^5$ | 10.5 | 10.1 |
| *13 | 0.485 | 0.485 | 0.03 | 1.00 | | 1.5 | $>10^9$ | $>10^9$ | — | — |
| *14 | 0.497 | 0.497 | 0.006 | 1.00 | Cu/O | | $1.1 \times 10^4$ | $3.7 \times 10^2$ | 3.14 | 7.5 |
| *15 | 0.497 | 0.497 | 0.006 | 1.00 | | 0.000005 | $1.1 \times 10^4$ | $3.7 \times 10^2$ | 3.14 | 7.5 |
| 16 | 0.497 | 0.497 | 0.006 | 1.00 | | 0.00001 | $2.5 \times 10^4$ | $4.6 \times 10^3$ | 3.42 | 18.9 |
| 17 | 0.497 | 0.497 | 0.006 | 1.00 | | 0.01 | $7.0 \times 10^3$ | $5.8 \times 10^5$ | 4.24 | 26.4 |
| 18 | 0.497 | 0.497 | 0.006 | 1.00 | | 1.2 | $9.2 \times 10^6$ | $5.8 \times 10^5$ | 3.74 | 11.2 |
| *19 | 0.497 | 0.497 | 0.006 | 1.00 | | 1.5 | $>10^9$ | $>10^9$ | — | — |
| *20 | 0.485 | 0.485 | 0.03 | 1.00 | Cu/O | | $>10^9$ | $3.2 \times 10^3$ | 13.8 | 1.21 |
| *21 | 0.485 | 0.485 | 0.03 | 1.00 | | 0.000005 | $>10^9$ | $3.2 \times 10^3$ | 13.8 | 1.21 |

TABLE 3-continued

| Specimen No. | Main Components Molar Ratio of Each Component | | | | Minor Component wt % | | Specific Resistance Ω-cm | | Temperature Coefficient %/°C. | |
|---|---|---|---|---|---|---|---|---|---|---|
| | SrO | PbO | ½(Y$_2$O$_3$) | TiO$_2$ | M | | $\rho_{20}$ (at 20° C.) | $\rho_{min}$ (minimum) | $-\alpha$ | $\alpha$ |
| 22 | 0.485 | 0.485 | 0.03 | 1.00 | | 0.00001 | >10$^9$ | 5.6 × 10$^3$ | 12.9 | 4.4 |
| 23 | 0.485 | 0.485 | 0.03 | 1.00 | | 0.01 | >10$^9$ | 9.8 × 10$^8$ | 13.4 | 15.6 |
| 24 | 0.485 | 0.485 | 0.03 | 1.00 | | 1.2 | >10$^9$ | 5.2 × 10$^5$ | 10.4 | 12.6 |
| *25 | 0.485 | 0.485 | 0.03 | 1.00 | | 1.5 | >10$^9$ | >10$^9$ | — | — |
| 26 | 0.497 | 0.497 | 0.006 | 1.00 | V | 0.01 | 9.2 × 10$^5$ | 3.6 × 10$^3$ | 4.3 | 22.4 |
| 27 | 0.497 | 0.497 | 0.006 | 1.00 | Cr | 0.01 | 8.1 × 10$^5$ | 9.8 × 10$^2$ | 5.6 | 24.4 |
| 28 | 0.497 | 0.497 | 0.006 | 1.00 | Ni | 0.01 | 1.2 × 10$^6$ | 6.2 × 10$^3$ | 4.6 | 23.6 |
| 29 | 0.497 | 0.497 | 0.006 | 1.00 | Ce | 0.01 | 2 × 10$^7$ | 9.2 × 10$^3$ | 4.4 | 25.4 |
| 30 | 0.497 | 0.497 | 0.006 | 1.00 | Fe | 0.01 | 3.2 × 10$^6$ | 5.8 × 10$^3$ | 4.7 | 22.7 |
| 31 | 0.497 | 0.497 | 0.006 | 1.00 | Os | 0.01 | 5.1 × 10$^5$ | 6.5 × 10$^2$ | 5.7 | 24.1 |
| 32 | 0.497 | 0.497 | 0.006 | 1.00 | Ge | 0.01 | 4.6 × 10$^6$ | 1.2 × 10$^3$ | 5.3 | 27.2 |
| 33 | 0.497 | 0.497 | 0.006 | 1.00 | Hf | 0.01 | 3.3 × 10$^6$ | 2.5 × 10$^3$ | 4.7 | 22.4 |
| *34 | 0.485 | 0.485 | 0.03 | 0.88 | Co | 0.01 | >10$^9$ | 4.2 × 10$^3$ | 12.6 | 12.6 |
| 35 | 0.485 | 0.485 | 0.03 | 1.00 | Sb | 0.01 | >10$^9$ | 4.1 × 10$^3$ | 13.2 | 12.8 |
| 36 | 0.485 | 0.485 | 0.03 | 1.00 | Ru | 0.01 | >10$^9$ | 4.7 × 10$^3$ | 13.5 | 13.1 |
| 37 | 0.485 | 0.485 | 0.03 | 1.00 | Zn | 0.01 | >10$^9$ | 5.2 × 10$^3$ | 13.4 | 13.2 |
| 38 | 0.485 | 0.485 | 0.03 | 1.00 | P | 0.01 | >10$^9$ | 5.1 × 10$^3$ | 13.6 | 13.0 |
| 39 | 0.485 | 0.485 | 0.03 | 1.00 | Mg | 0.01 | >10$^9$ | 3.7 × 10$^3$ | 13.8 | 12.4 |
| 40 | 0.497 | 0.497 | 0.006 | 1.00 | Cu + Mn | 0.005 + 0.005 | 6.3 × 10$^5$ | 2.6 × 10$^3$ | 4.4 | 23.3 |
| 41 | 0.485 | 0.485 | 0.03 | 1.00 | Ni + Fe | 0.005 + 0.005 | >10$^9$ | 4.4 × 10$^3$ | 13.6 | 12.3 |
| *42 | 0.497 | 0.497 | 0.006 | 1.00 | Li/O | | 1.1 × 10$^4$ | 3.7 × 10$^2$ | 3.14 | 7.5 |
| *43 | 0.497 | 0.497 | 0.006 | 1.00 | | 0.000005 | 1.1 × 10$^5$ | 7.1 × 10$^2$ | 4.81 | 4.69 |
| 44 | 0.497 | 0.497 | 0.006 | 1.00 | | 0.00001 | 2.9 × 10$^6$ | 2.0 × 10$^3$ | 7.23 | 3:14 |
| 45 | 0.497 | 0.497 | 0.006 | 1.00 | | 0.01 | 6.6 × 10$^7$ | 4.0 × 10$^3$ | 10.5 | 2.54 |
| 46 | 0.497 | 0.497 | 0.006 | 1.00 | | 1.20 | >10$^9$ | 1.9 × 10$^4$ | 15.5 | 0.47 |
| *47 | 0.497 | 0.497 | 0.006 | 1.00 | | 1.5 | >10$^9$ | >10$^9$ | — | — |
| *48 | 0.485 | 0.485 | 0.03 | 1.00 | Li/O | | >10$^9$ | 3.2 × 10$^3$ | 13.8 | 1.21 |
| 49 | 0.485 | 0.485 | 0.03 | 1.00 | | 0.000005 | >10$^9$ | 3.2 × 10$^3$ | 13.8 | 1.21 |
| 50 | 0.485 | 0.485 | 0.03 | 1.00 | | 0.00001 | >10$^9$ | 9.1 × 10$^2$ | 18.1 | 1.01 |
| 51 | 0.485 | 0.485 | 0.03 | 1.00 | | 0.010 | >10$^9$ | 1.3 × 10$^3$ | 27.0 | 0 |
| 52 | 0.485 | 0.485 | 0.03 | 1.00 | | 1.2 | >10$^9$ | 2.5 × 10$^5$ | 16.0 | 0 |
| *53 | 0.485 | 0.485 | 0.03 | 1.00 | | 1.5 | >10$^9$ | >10$^9$ | — | — |
| *54 | 0.497 | 0.497 | 0.006 | 1.00 | Al/O | | 1.1 × 10$^4$ | 3.7 × 10$^2$ | 3.14 | 7.5 |
| *55 | 0.497 | 0.497 | 0.006 | 1.00 | | 0.000005 | 1.1 × 10$^4$ | 3.7 × 10$^2$ | 3.14 | 7.5 |
| 56 | 0.497 | 0.497 | 0.006 | 1.00 | | 0.00001 | 1.5 × 10$^6$ | 7.2 × 10$^2$ | 5.34 | 4.32 |
| 57 | 0.497 | 0.497 | 0.006 | 1.00 | | 0.01 | 6 × 10$^8$ | 1.2 × 10$^3$ | 13.2 | 3.23 |
| 58 | 0.497 | 0.497 | 0.006 | 1.00 | | 8.0 | >10$^9$ | 5.2 × 10$^5$ | 11.3 | 0.3 |
| *59 | 0.497 | 0.497 | 0.006 | 1.00 | | 10.0 | >10$^9$ | >10$^9$ | — | — |
| *60 | 0.485 | 0.485 | 0.03 | 1.00 | Al/O | | >10$^9$ | 3.2 × 10$^3$ | 13.8 | 1.21 |
| *61 | 0.485 | 0.485 | 0.03 | 1.00 | | 0.000005 | >10$^9$ | 3.2 × 10$^3$ | 13.8 | 1.21 |
| 62 | 0.485 | 0.485 | 0.03 | 1.00 | | 0.00001 | >10$^9$ | 8.3 × 10$^2$ | 35.0 | 0 |
| 63 | 0.485 | 0.485 | 0.03 | 1.00 | | 0.01 | >10$^9$ | 9.0 × 10$^2$ | 38.1 | 0 |
| 64 | 0.485 | 0.485 | 0.03 | 1.00 | | 8.0 | >10$^9$ | 1.4 × 10$^5$ | 32.0 | 0 |
| *65 | 0.485 | 0.485 | 0.03 | 1.00 | | 10.0 | >10$^9$ | >10$^9$ | — | — |
| 66 | 0.497 | 0.497 | 0.006 | 1.00 | W | 0.1 | 5.5 × 10$^6$ | 1.8 × 10$^3$ | 7.6 | 4.12 |
| 67 | 0.497 | 0.497 | 0.006 | 1.00 | Ga | 0.01 | 5.6 × 10$^6$ | 2.8 × 10$^3$ | 7.6 | 5.03 |
| 68 | 0.497 | 0.497 | 0.006 | 1.00 | In | 0.01 | 7.2 × 10$^6$ | 3.3 × 10$^3$ | 8.4 | 4.62 |
| 69 | 0.497 | 0.497 | 0.006 | 1.00 | Tl | 0.01 | 6.5 × 10$^5$ | 2.2 × 10$^2$ | 6.6 | 4.44 |
| 70 | 0.497 | 0.497 | 0.006 | 1.00 | Nb | 0.01 | 2.8 × 10$^7$ | 1.6 × 10$^3$ | 8.2 | 4.38 |
| 71 | 0.497 | 0.497 | 0.006 | 1.00 | Na | 0.01 | 7.7 × 10$^5$ | 1.7 × 10$^3$ | 7.8 | 4.44 |
| 72 | 0.497 | 0.497 | 0.006 | 1.00 | B | 0.01 | 6.9 × 10$^5$ | 1.1 × 10$^3$ | 7.7 | 4.33 |
| 73 | 0.497 | 0.497 | 0.006 | 1.00 | Th | 0.01 | 2.6 × 10$^7$ | 2.6 × 10$^3$ | 8.4 | 5.20 |
| 74 | 0.497 | 0.497 | 0.006 | 1.00 | Ta | 0.01 | 2.2 × 10$^8$ | 2.7 × 10$^3$ | 7.7 | 6.54 |
| 75 | 0.497 | 0.497 | 0.006 | 1.00 | Mo | 0.01 | 1.2 × 10$^6$ | 9.5 × 10$^2$ | 8.8 | 3.82 |
| 76 | 0.497 | 0.497 | 0.006 | 1.00 | Ag | 0.01 | 5.8 × 10$^5$ | 1.1 × 10$^3$ | 6.4 | 2.99 |
| 77 | 0.497 | 0.497 | 0.006 | 1.00 | Cs | 0.01 | 2 × 10$^6$ | 1 × 10$^2$ | 7.9 | 4.42 |
| 78 | 0.497 | 0.497 | 0.006 | 1.00 | Rb | 0.01 | 3 × 10$^6$ | 1.5 × 10$^3$ | 10.1 | 4.41 |
| 79 | 0.485 | 0.485 | 0.03 | 1.00 | Sc | 0.01 | >10$^9$ | 7 × 10$^2$ | 37.3 | 0 |
| 80 | 0.485 | 0.485 | 0.03 | 1.00 | Bi | 0.01 | >10$^9$ | 1 × 10$^3$ | 28.6 | 0 |
| 81 | 0.485 | 0.485 | 0.03 | 1.00 | K | 0.01 | >10$^9$ | 4.2 × 10$^3$ | 42.0 | 0 |
| 82 | 0.485 | 0.485 | 0.03 | 1.00 | La | 0.01 | >10$^9$ | 3.4 × 10$^3$ | 44.4 | 0 |
| 83 | 0.485 | 0.485 | 0.03 | 1.00 | Nd | 0.01 | >10$^9$ | 5.6 × 10$^3$ | 36.2 | 0 |
| 84 | 0.497 | 0.497 | 0.006 | 1.00 | W 0.05 Al 0.05 | | 6.3 × 10$^7$ | 1.9 × 10$^3$ | 8.7 | 0 |
| 85 | 0.485 | 0.485 | 0.03 | 1.00 | Li 0.05 Nb 0.05 | | >10$^9$ | 3.2 × 10$^3$ | 44.2 | 0 |

TABLE 4

| Specimen No. | Main Components Molar Ratio of Each Component | | | | Minor Components wt. % | | Specific Resistance Ω·cm | | Temperature Coefficient %/°C | | ST* °C. |
|---|---|---|---|---|---|---|---|---|---|---|---|
| | SrO | PbO | ½(Y₂O₃) | TiO₂ | SiO₂ | M | ρ 20 (at 20° C.) | ρ min (minimum) | −α | α | |
| 1 | 0.497 | 0.497 | 0.006 | 0.95 | 0.4 | 0 | $9.5 \times 10^3$ | $2.5 \times 10^2$ | 3.20 | 7.5 | 1160 |
| 2 | 0.497 | 0.497 | 0.006 | 1.2 | 0.4 | 0 | $1.0 \times 10^3$ | $8.2 \times 10^5$ | 3.11 | 4.7 | 1160 |
| 3 | 0.485 | 0.485 | 0.03 | 0.95 | 5.0 | 0 | $>10^9$ | $9.8 \times 10^2$ | 23.0 | 0 | 1150 |
| 4 | 0.485 | 0.485 | 0.03 | 1.2 | 5.0 | 0 | $>10^9$ | $5.2 \times 10^2$ | 25.0 | 0 | 1140 |
| 5 | 0.497 | 0.497 | 0.006 | 0.95 | 0 | Mn 0.01 | $2.0 \times 10^3$ | $1.2 \times 10^1$ | 1.70 | 23.8 | |
| 6 | 0.497 | 0.497 | 0.006 | 1.2 | 0 | Mn 0.01 | $1.0 \times 10^3$ | $9.8 \times 10^3$ | 1.82 | 22.8 | |
| 7 | 0.485 | 0.485 | 0.03 | 0.95 | 0 | Mn 0.01 | $>10^9$ | $1 \times 10^2$ | 13.3 | 13.2 | |
| 8 | 0.485 | 0.485 | 0.03 | 1.2 | 0 | Mn 0.01 | $>10^9$ | $2.2 \times 10^2$ | 14.2 | 13.4 | |
| 9 | 0.497 | 0.497 | 0.006 | 0.95 | 0 | Li 0.01 | $1.0 \times 10^6$ | $3.2 \times 10^2$ | 7.4 | 3.20 | |
| 10 | 0.497 | 0.497 | 0.006 | 1.2 | 0 | Li 0.01 | $2.1 \times 10^5$ | $9.6 \times 10^1$ | 6.8 | 3.44 | |
| 11 | 0.485 | 0.485 | 0.03 | 0.95 | 0 | Li 0.01 | $>10^9$ | $9.5 \times 10^2$ | 28.1 | 0 | |
| 12 | 0.485 | 0.485 | 0.03 | 1.2 | 0 | Li 0.01 | $>10^9$ | $2.3 \times 10^2$ | 30.0 | 0 | |
| 13 | 0.497 | 0.497 | 0.006 | 1.00 | 0.4 | Mn 0.01 | $1.8 \times 10^4$ | $1.8 \times 10^3$ | 1.70 | 24.8 | 1160 |
| 14 | 0.485 | 0.485 | 0.03 | 1.00 | 5.0 | Mn 0.01 | $>10^9$ | $4.2 \times 10^3$ | 19.5 | 12.8 | 1150 |
| 15 | 0.497 | 0.497 | 0.006 | 1.00 | 0.4 | Li 0.01 | $2 \times 10^6$ | $1.6 \times 10^3$ | 7.51 | 3.20 | 1160 |
| 16 | 0.485 | 0.485 | 0.03 | 1.00 | 5.0 | Li 0.01 | $>10^9$ | $9.8 \times 10^2$ | 32.5 | 0 | 1140 |
| 17 | 0.497 | 0.497 | 0.006 | 0.95 | 0.4 | Mn 0.01 | $1 \times 10^4$ | $9.8 \times 10^2$ | 1.63 | 22.4 | 1160 |
| 18 | 0.497 | 0.497 | 0.006 | 1.2 | 0.4 | Mn 0.01 | $5 \times 10^3$ | $2 \times 10^2$ | 1.78 | 21.6 | 1160 |
| 19 | 0.485 | 0.485 | 0.03 | 0.95 | 5.0 | Mn 0.01 | $1 \times 10^9$ | $1 \times 10^3$ | 18.7 | 13.3 | 1150 |
| 20 | 0.485 | 0.485 | 0.03 | 1.2 | 5.0 | Mn 0.01 | $5.2 \times 10^8$ | $1.4 \times 10^2$ | 17.7 | 16.1 | 1140 |
| 21 | 0.497 | 0.497 | 0.006 | 0.95 | 0.4 | Li 0.01 | $1.5 \times 10^6$ | $8 \times 10^2$ | 7.55 | 3.14 | 1160 |
| 22 | 0.497 | 0.497 | 0.006 | 1.2 | 0.4 | Li 0.01 | $1 \times 10^6$ | $1.4 \times 10^2$ | 7.70 | 3.50 | 1150 |
| 23 | 0.485 | 0.485 | 0.03 | 0.95 | 5.0 | Li 0.01 | $>10^9$ | $5 \times 10^2$ | 31.1 | 0 | 1140 |
| 24 | 0.485 | 0.485 | 0.03 | 1.2 | 5.0 | Li 0.01 | $8 \times 10^8$ | $1 \times 10^2$ | 33.1 | 0 | 1140 |

ST*... Semiconductivity starting temperature

TABLE 5

| Specimen No. | Main Components Molar Ratio of Each Component | | | | | Specific Resistance Ω·cm | | Temperature Coefficient %/°C | |
|---|---|---|---|---|---|---|---|---|---|
| | SrO | PbO | ½(Y₂O₃) | CaO, BaO CaO + BaO | TiO₂ | ρ 20 (at 20° C.) | ρ min (minimum) | −α | α |
| *1 | 0.497 | 0.497 | 0.006 | CaO 0 | 1.00 | $1.1 \times 10^4$ | $3.7 \times 10^2$ | 3.14 | 7.50 |
| *2 | 0.4967 | 0.4967 | 0.006 | 0.0050 | 1.00 | $1.1 \times 10^4$ | $3.7 \times 10^2$ | 3.14 | 7.50 |
| 3 | 0.4965 | 0.4965 | 0.006 | 0.001 | 1.00 | $1.1 \times 10^4$ | $3.7 \times 10^2$ | 3.14 | 10.3 |
| 4 | 0.492 | 0.492 | 0.006 | 0.01 | 1.00 | $1.1 \times 10^4$ | $3.7 \times 10^2$ | 3.11 | 15.5 |
| 5 | 0.447 | 0.447 | 0.006 | 0.1 | 1.00 | $2.6 \times 10^5$ | $3.3 \times 10^3$ | 3.12 | 17.2 |
| 6 | 0.347 | 0.347 | 0.006 | 0.3 | 1.00 | $7.6 \times 10^7$ | $1.2 \times 10^5$ | 3.30 | 18.4 |
| *7 | 0.322 | 0.322 | 0.006 | 0.35 | 1.00 | $>10^7$ | $>10^9$ | — | — |
| *8 | 0.485 | 0.485 | 0.006 | 0 | 1.00 | $>10^9$ | $3.2 \times 10^3$ | 13.8 | 1.21 |
| *9 | 0.4847 | 0.4847 | 0.03 | 0.0005 | 1.00 | $>10^9$ | $3.2 \times 10^3$ | 13.8 | 1.21 |
| 10 | 0.4845 | 0.4845 | 0.03 | 0.001 | 1.00 | $>10^9$ | $3.2 \times 10^3$ | 13.8 | 4.02 |
| 11 | 0.48 | 0.48 | 0.03 | 0.01 | 1.00 | $>10^9$ | $3.2 \times 10^3$ | 13.8 | 10.4 |
| 12 | 0.335 | 0.335 | 0.03 | 0.3 | 1.00 | $>10^9$ | $5 \times 10^5$ | 11.7 | 11.20 |
| *13 | 0.31 | 0.31 | 0.03 | 0.35 | 1.00 | $>10^9$ | $>10^9$ | — | — |
| *14 | 0.497 | 0.497 | 0.006 | BaO 0 | 1.00 | $1.1 \times 10^4$ | $3.7 \times 10^2$ | 3.14 | 7.5 |
| *15 | 0.4967 | 0.4967 | 0.006 | 0.0005 | 1.00 | $1.1 \times 10^4$ | $3.7 \times 10^2$ | 3.14 | 7.5 |
| 16 | 0.4965 | 0.4965 | 0.006 | 0.001 | 1.00 | $1.1 \times 10^4$ | $3.7 \times 10^2$ | 3.14 | 10.4 |
| 17 | 0.492 | 0.492 | 0.006 | 0.01 | 1.00 | $1.2 \times 10^4$ | $3.6 \times 10^2$ | 3.30 | 15.6 |
| 18 | 0.335 | 0.335 | 0.006 | 0.3 | 1.00 | $4.8 \times 10^7$ | $1.2 \times 10^5$ | 3.40 | 11.3 |
| *19 | 0.322 | 0.322 | 0.006 | 0.35 | 1.00 | $>10^9$ | $>10^9$ | — | — |
| *20 | 0.485 | 0.485 | 0.03 | 0 | 1.00 | $>10^9$ | $3.2 \times 10^3$ | 13.8 | 1.21 |
| *21 | 0.4847 | 0.4847 | 0.03 | 0.0005 | 1.00 | $>10^9$ | $3.2 \times 10^3$ | 13.8 | 1.21 |
| 22 | 0.4845 | 0.4845 | 0.03 | 0.001 | 1.00 | $>10^9$ | $3.2 \times 10^3$ | 14.0 | 5.12 |
| 23 | 0.492 | 0.492 | 0.006 | 0.01 | 1.00 | $>10^9$ | $3.3 \times 10^3$ | 13.9 | 13.4 |
| 24 | 0.347 | 0.347 | 0.006 | 0.3 | 1.00 | $>10^9$ | $4.3 \times 10^5$ | 14.0 | 11.2 |
| *25 | 0.322 | 0.322 | 0.006 | 0.35 | 1.00 | $>10^9$ | $>10^9$ | — | — |
| 26 | 0.492 | 0.492 | 0.006 | CaO 0.005 BaO 0.005 | 1.00 | $1.4 \times 10^4$ | $3.2 \times 10^2$ | 3.40 | 17.0 |
| 27 | 0.48 | 0.48 | 0.03 | CaO 0.005 BaO 0.005 | 1.00 | $>10^9$ | $2.8 \times 10^2$ | 15.4 | 14.1 |

TABLE 6

| Specimen No. | Main Components Molar Ratio of Each Component | | | | | Minor Components wt. % | | Specific Resistance Ω-cm | | Temperature Coefficient %/°C | | ST* °C. |
|---|---|---|---|---|---|---|---|---|---|---|---|---|
| | SrO | PbO | ½(Y₂O₃) | CaO | TiO₂ | SiO₂ | M | ρ20 (at 20° C.) | ρmin (minimum) | −α | α | |
| 1 | 0.492 | 0.492 | 0.006 | CaO 0.01 | 0.95 | 0.4 | 0 | $8 \times 10^3$ | $7.8 \times 10^2$ | 2.88 | 18.0 | 1160 |
| 2 | 0.492 | 0.492 | 0.006 | CaO 0.01 | 1.2 | 0.4 | 0 | $1.0 \times 10^3$ | $5.2 \times 10^1$ | 3.32 | 17.2 | 1160 |

TABLE 6-continued

| Specimen No. | Main Components Molar Ratio of Each Component | | | | | Minor Components wt. % | | Specific Resistance Ω-cm | | Temperature Coefficient %/°C. | | ST* °C. |
|---|---|---|---|---|---|---|---|---|---|---|---|---|
| | SrO | PbO | ½(Y$_2$O$_3$) | CaO | TiO$_2$ | SiO$_2$ | M | ρ$_{20}$ (at 20° C.) | ρ$_{min}$ (minimum) | −α | α | |
| 3 | 0.48 | 0.48 | 0.03 | CaO 0.01 | 0.95 | 5.0 | 0 | 1 × 10$^9$ | 5.8 × 10$^2$ | 20.4 | 11.3 | 1150 |
| 4 | 0.48 | 0.48 | 0.03 | CaO 0.01 | 1.2 | 5.0 | 0 | 7 × 10$^8$ | 1.2 × 10$^2$ | 1.70 | 31.5 | 1140 |
| 5 | 0.492 | 0.492 | 0.006 | CaO 0.01 | 1.2 | 0 | 0 | 1.1 × 10$^3$ | 5.2 × 10$^9$ | 3.12 | 16.8 | |
| 6 | 0.48 | 0.48 | 0.03 | CaO 0.01 | 0.95 | 0 | 0 | 7.8 × 10$^3$ | 1 × 10$^3$ | 14.4 | 10.4 | |
| 7 | 0.48 | 0.48 | 0.03 | CaO 0.01 | 1.2 | 0 | 0 | >10$^9$ | 2.4 × 10$^2$ | 15.3 | 10.0 | |
| 8 | 0.492 | 0.492 | 0.006 | CaO 0.01 | 0.95 | 0 | Mn 0.01 | 1.2 × 10$^4$ | 1 × 10$^3$ | 1.58 | 32.3 | |
| 9 | 0.492 | 0.492 | 0.006 | CaO 0.01 | 1.2 | 0 | Mn 0.01 | 7.8 × 10$^3$ | 5 × 10$^2$ | 1.65 | 34.4 | |
| 10 | 0.48 | 0.48 | 0.03 | CaO 0.01 | 0.95 | 0 | Mn 0.01 | >10$^9$ | 1 × 10$^3$ | 13.4 | 17.6 | |
| 11 | 0.48 | 0.48 | 0.03 | CaO 0.01 | 1.2 | 0 | Mn 0.01 | 6 × 10$^8$ | 2.1 × 10$^2$ | 14.4 | 30.0 | |
| 12 | 0.492 | 0.492 | 0.006 | CaO 0.01 | 0.95 | 0 | Li 0.01 | 1.2 × 10$^6$ | 9.4 × 10$^2$ | 7.77 | 12.4 | |
| 13 | 0.492 | 0.492 | 0.006 | CaO 0.01 | 1.2 | 0 | Li 0.01 | 5.8 × 10$^5$ | 4.3 × 10$^2$ | 8.02 | 13.2 | |
| 14 | 0.48 | 0.48 | 0.03 | CaO 0.01 | 0.95 | 0 | Li 0.01 | >10$^9$ | 1 × 10$^3$ | 23.4 | 8.1 | |
| 15 | 0.48 | 0.48 | 0.03 | CaO 0.01 | 1.2 | 0 | Li 0.01 | 6 × 10$^8$ | 3.2 × 10$^2$ | 26.0 | 7.9 | |
| 16 | 0.492 | 0.492 | 0.006 | CaO 0.01 | 1.00 | 0.4 | Mn 0.01 | 2.1 × 10$^4$ | 1.5 × 10$^3$ | 1.72 | 31.2 | 1160 |
| 17 | 0.48 | 0.48 | 0.03 | CaO 0.01 | 1.00 | 5.0 | Mn 0.01 | >10$^9$ | 3.5 × 10$^3$ | 18.8 | 17.9 | 1140 |
| 18 | 0.492 | 0.492 | 0.006 | CaO 0.01 | 1.00 | 0.4 | Li 0.01 | 3.1 × 10$^6$ | 1.4 × 10$^2$ | 7.20 | 10.8 | 1160 |
| 19 | 0.48 | 0.48 | 0.03 | CaO 0.01 | 1.00 | 5.0 | Li 0.01 | >10$^9$ | 1.4 × 10$^2$ | 29.2 | 7.8 | 1140 |
| 20 | 0.492 | 0.492 | 0.006 | CaO 0.01 | 0.95 | 0.4 | Mn 0.01 | 1 × 10$^4$ | 1.1 × 10$^3$ | 1.62 | 34.4 | 1160 |
| 21 | 0.492 | 0.492 | 0.006 | CaO 0.01 | 1.2 | 0.4 | Mn 0.01 | 6 × 10$^3$ | 4.8 × 10$^2$ | 1.48 | 35.2 | 1160 |
| 22 | 0.48 | 0.48 | 0.03 | CaO 0.01 | 0.95 | 5.0 | Mn 0.01 | 1 × 10$^9$ | 1.2 × 10$^3$ | 17.7 | 19.2 | 1150 |
| 23 | 0.48 | 0.48 | 0.03 | CaO 0.01 | 1.2 | 5.0 | Mn 0.01 | 7.2 × 10$^8$ | 5.2 × 10$^2$ | 18.4 | 20.4 | 1140 |
| 24 | 0.492 | 0.492 | 0.006 | CaO 0.01 | 0.95 | 5.0 | Li 0.01 | 9.5 × 10$^5$ | 5.2 × 10$^2$ | 8.12 | 11.8 | 1160 |
| 25 | 0.492 | 0.492 | 0.006 | CaO 0.01 | 1.2 | 0.4 | Li 0.01 | 2 × 10$^5$ | 1.1 × 10$^2$ | 7.92 | 13.2 | 1150 |
| 26 | 0.48 | 0.48 | 0.03 | CaO 0.01 | 0.95 | 5.0 | Li 0.01 | >10$^9$ | .5 × 10$^3$ | 30.0 | 10.1 | 1160 |
| 27 | 0.48 | 0.48 | 0.03 | CaO 0.01 | 1.2 | 5.0 | Mn 0.01 | 5.4 × 10$^2$ | 3 × 10$^2$ | 31.2 | 12.2 | 1140 |
| 28 | 0.492 | 0.492 | 0.006 | CaO 0.01 | 1.00 | 0.4 | 0 | 1.0 × 10$^4$ | 2.8 × 10$^2$ | 3.28 | 14.8 | 1160 |
| 29 | 0.48 | 0.48 | 0.03 | CaO 0.01 | 1.00 | 5.0 | 0 | >10$^9$ | 1.9 × 10$^3$ | 22.3 | 11.1 | 1150 |
| 30 | 0.492 | 0.492 | 0.006 | CaO 0.01 | 1.00 | 0 | Mn 0.01 | 2.2 × 10$^4$ | 1.9 × 10$^3$ | 1.66 | 30.4 | |
| 31 | 0.48 | 0.48 | 0.03 | CaO 0.01 | 1.00 | 0 | Mn 0.01 | >10$^9$ | 3.8 × 10$^3$ | 14.2 | 18.8 | |
| 32 | 0.492 | 0.492 | 0.006 | CaO 0.01 | 1.00 | 0 | Li 0.01 | 3.2 × 10$^6$ | 1.8 × 10$^3$ | 7.44 | 11.2 | |
| 33 | 0.48 | 0.48 | 0.03 | CaO 0.01 | 1.00 | 0 | Li 0.01 | >10$^9$ | 2.4 × 10$^3$ | 25.4 | 7.8 | |

ST* ... Semiconductivity starting temperature

TABLE 1 indicates that compositions containing TiO$_2$ of less than 0.90 mol or more than 2.0 mol are increased in resistance to a degree sufficient to render them impractical, as apparent from test results of the compositions of Specimens Nos. 1, 8, 9, 16, 17 and 31. An increase in amount of TiO$_2$ causes specific resistance or resistivity ρ$_{min}$ to be moved upwardly without varying −α and α or a gradient of a temperature coefficient, as seen from Specimens Nos. 3 to 7 and Nos. 13 to 15. Test results on Specimens Nos. 18 to 23, Nos. 26 to 29 and Nos. 32 to 35 indicate that an increase in Y$_2$O$_3$ which is an additive for semiconductivity causes each composition to exhibit CTR characteristics rather than V-type PTC characteristics, and Specimens Nos. 13 to 15 indicate that an increase in TiO$_2$ as well as that in Y$_2$O$_3$ leads to movement of the resistivity from a lower level to a high level without varying the temperature coefficients −α$_1$ and α. Specimens Nos. 38 to 42, Nos. 45 to 47 and Nos. 50 to 52 possess V-type PTC characteristics and each indicate that an increase in Sr and a decrease in Pb result in a curie point Tc of each composition being substantially moved toward a negative side. Specimens Nos. 55 to 59, Nos. 62 to 64 and Nos. 67 to 69 each possess CTR characteristics and have a curie point Tc substantially moved toward a negative side, so that the curie point Tc may be controlled over a wide range extending to the vicinity of a curie point of each of simple substances SrTiO$_3$ and PbTiO$_3$. A content of Pb more than 0.85 mol or less than 0.05 mol in the composition increases its resistance to a degree sufficient to render the composition impractical. In compositions of Specimens Nos. 71 to 81, rare earth elements are used as R. It will be noted that each of the rare earth elements exhibits substantially the same behavior as Y$_2$O$_3$ used in Specimens Nos. 1 to 70. FIG. 1 shows relationships between resistivity and a temperature in some representatives of the specimens shown in TABLE 1.

Figure 2:
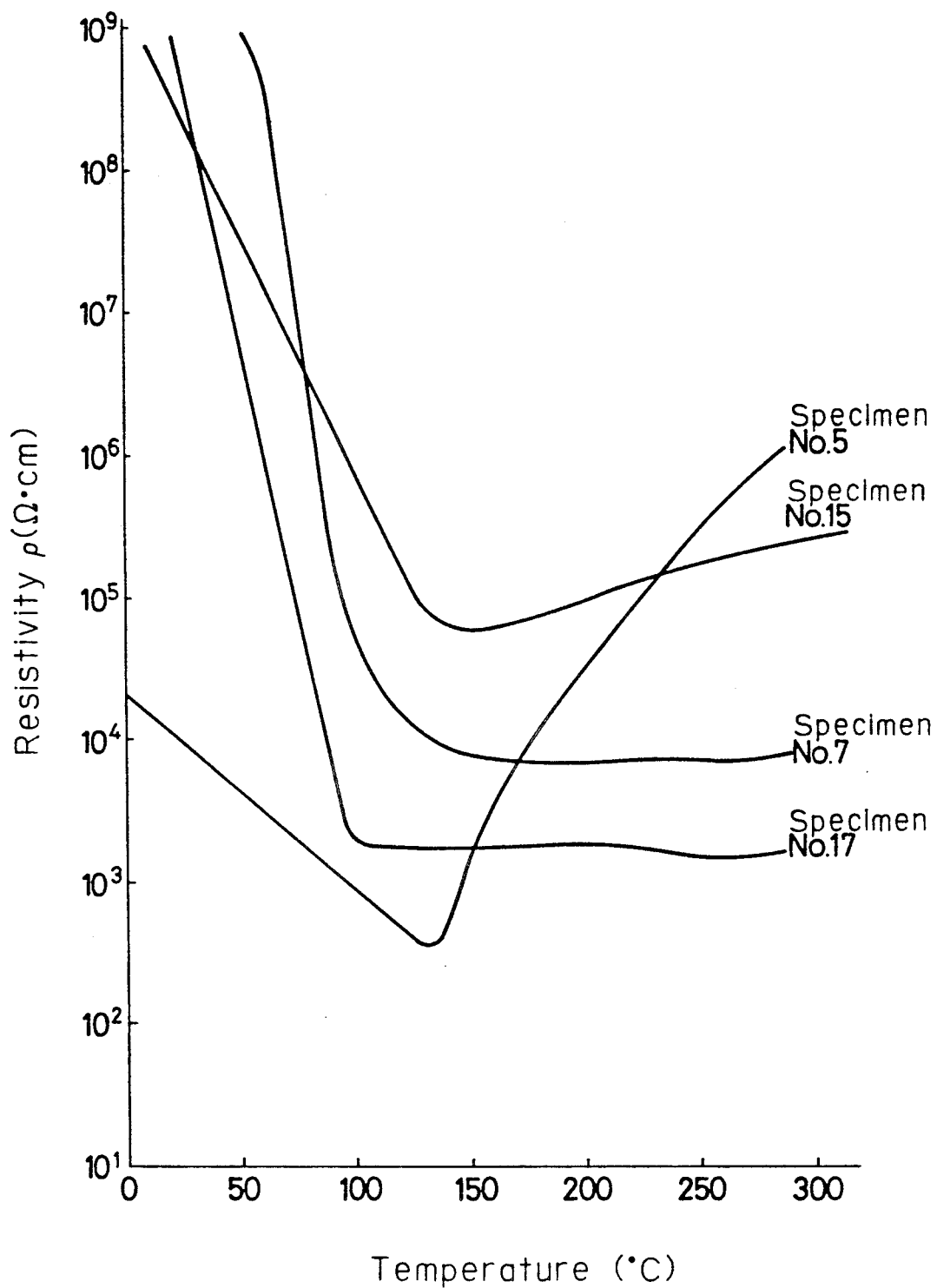

The compositions shown in TABLE 2 each were prepared so as to contain SrO, PbO and TiO$_2$ as a main component and SiO$_2$ as a minor component. In TABLE 2, Specimens Nos. 3 to 9 and Nos. 13 to 19 each indicate that it is substantially varied in −α with an increase in addition of SiO$_2$, so that characteristics of the composition are changed from V-type characteristics to CTR characteristics when a content of SiO$_2$ is 2.0 wt% or more, resulting in its semiconductivity starting temperature ST being lowered by 20° to 50° C. This means that an optimum temperature for the firing is likewise lowered, leading to energy savings and mass production of the composition at significantly reduced costs. A content of SiO$_2$ below 0.001 wt% fails to cause the semiconductivity starting temperature to be lowered, whereas when SiO$_2$ is contained at a level of 30 wt% or more in the composition, the composition is not provided with semiconductivity, resulting in being melted during firing. An experiment revealed that a quantitative range of each of SrO, PbO, Y$_2$O$_3$ and TiO$_2$ in TABLE 2 is substantially the same as that in TABLE 1 irrespective of addition of SiO$_2$. FIG. 2 shows relationships between resistivity and a temperature in some representatives of the specimens shown in TABLE 2.

The compositions shown in TABLE 3 each were prepared so as to contain SrO, PbO and TiO$_2$ as a main component and M as a minor component. M is at least one material selected from the group consisting of Mn, Cu, Cr, Ni, Fe, Co, Ru, Os, Ge, Hf, P, Sb, V, Mg, Zn, W, Al, Mo, In, Ga, Nb, Ta, Bi, Sc, rare earth elements, Th, Na, K, Li, B, Ag, Cs and Rb. In each of the compositions, the amount of M is varied while keeping the amount of $Y_2O_3$ at a typical level sufficient to permit it to exhibit V-type characteristics and CTR characteristics. As will be noted from Specimens Nos. 3 to 6, Nos. 10 to 12, Nos. 16 to 13 and Nos. 22 to 24, Mh and Cu contributes to an increase in temperature coefficient $\alpha$ of the composition to enhance the PTC characteristics. However, the amount of M below 0.00001 wt% fails to permit the composition to exhibit such advantages and M in an amount above 1.2 wt% increases resistance of the composition to a degree sufficient to render it impractical. Specimens Nos. 26 to 39 relate to addition of V, Cr, Ni, Ce, Fe, Os, Ge, f, Co, Sb, Ru, Zn, P and Mg, respectively. Each of the elements exhibits substantially the same advantage as Mn and Cu.

Specimens Nos. 40 and 41 each were prepared so as to contain two kinds of elements simultaneously added. It will be noted that the combined addition of the elements exhibits substantially the same advantage as described above.

An experiment indicated that a quantitative range of each of SrO, PbO, $Y_2O_3$ and $TiO_2$ in TABLE 3 is substantially the same as that in TABLE 1 irrespective of addition of the M. Li, Al, W, Ga, In, Tl, Nb, Na, B, Th, Ta, Mo, Ag, Cs, Rb, Sc, Bi, K, La, Nd and rear earth elements except Ce each contributes to an increase in temperature coefficient $-\alpha$ of the composition, resulting in the NTC characteristics being emphasized, as apparent from Specimens Nos. 45 to 44, Nos. 51 to 53, Nos. 57 to 59, Nos. 63 to 65 and Nos. 67 to 83. A content of each component below 0.0001 wt% falls to exhibit any effect and the content of 1.2 wt% or more (8 wt% or more in the case of Al) causes resistance of the composition to be increased to a degree sufficient to render it impractical. A combination of the M such as, for example, W, Al, Li+Nb or the like likewise leads to an increase is temperature coefficient $-\alpha$, as noted from Specimens Nos. 84 and 85.

Figure 3:
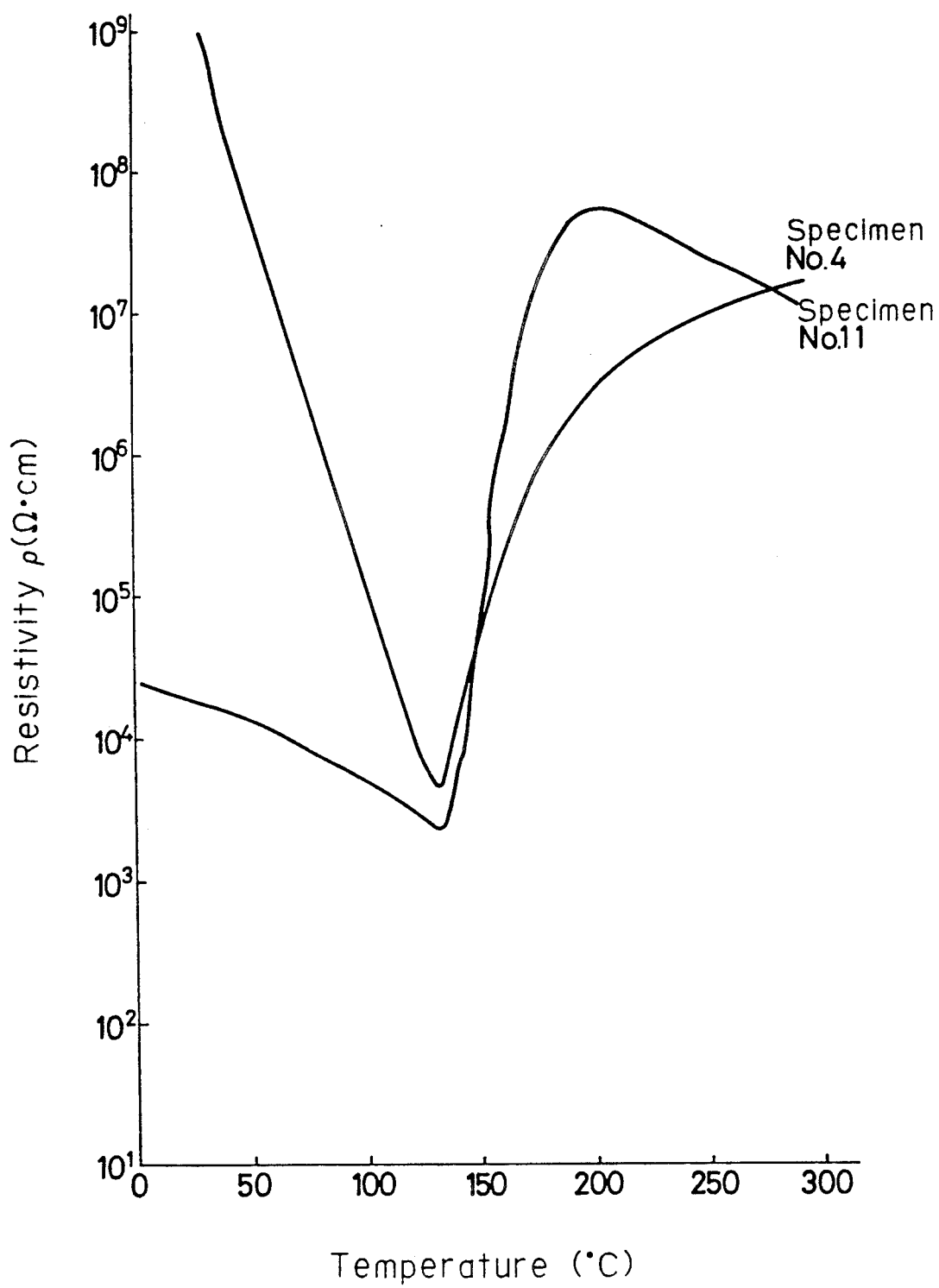
Figure 4:
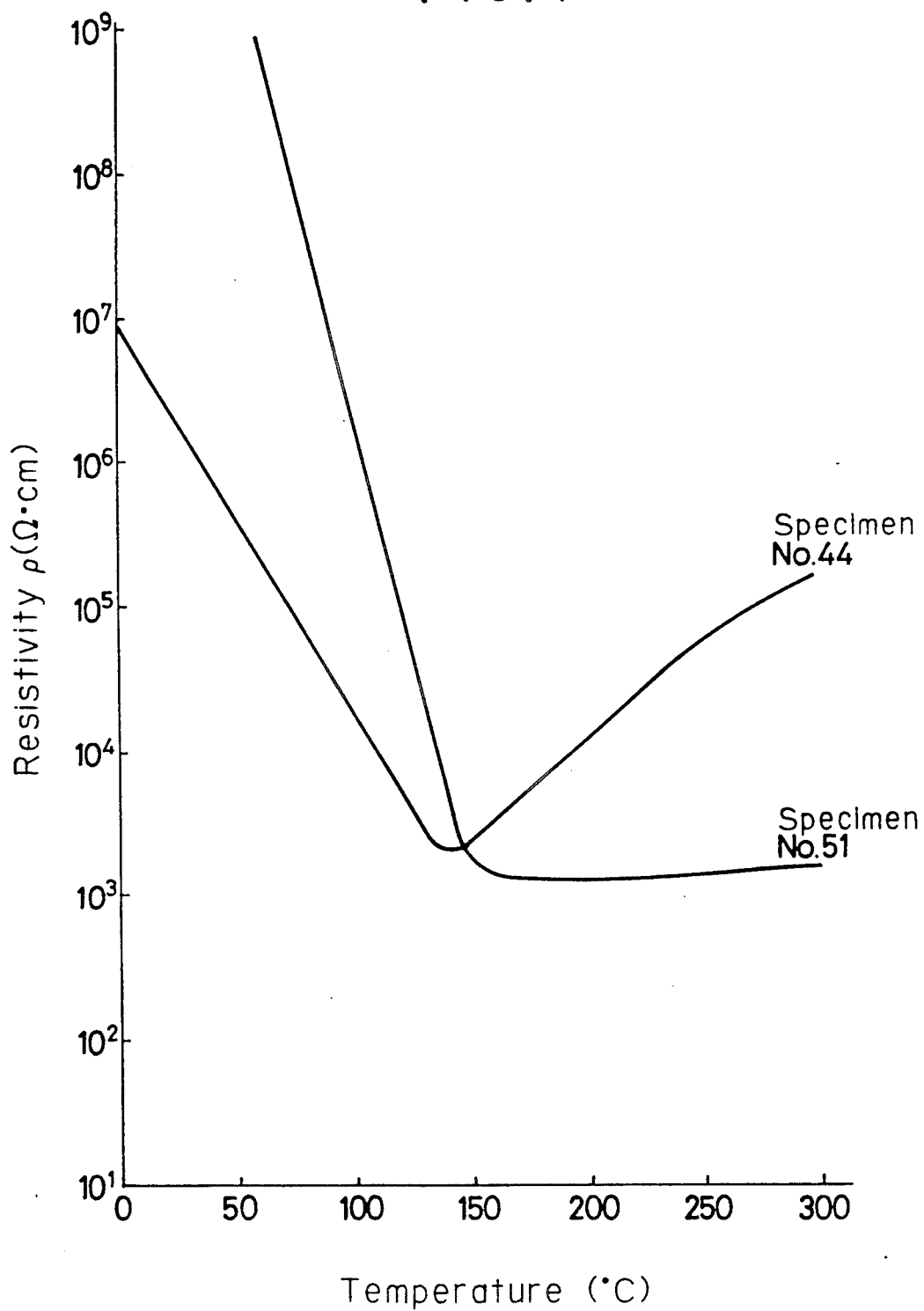

FIGS. 3 and 4 each show relationships between resistivity and a temperature in some representatives of specimens shown in TABLE 3.

The compositions shown in TABLE 4 each were prepared so as to contain SrO, PbO and $TiO_2$ as a main component and $SiO_2$ and M as a minor component. TABLE 4 indicates that concurrent or combined addition of $SiO_2$ and M exhibits a combination of advantages obtained by adding the components independent from each other.

In TABLE 4, Specimens Nos. 1 to 4 indicate advantages obtained due to an increase in $TiO_2$ and addition of $SiO_2$. More specifically, addition of $SiO_2$ causes a semiconductivity starting temperature of the composition to be lowered and an increase in $TiO_2$ permits resistance of the composition to be adjusted without significantly varying its temperature coefficients $\alpha$ and $-\alpha$.

Specimens Nos. 5 to 12 indicate advantages due to an increase in $TiO_2$ and addition of M. Addition of Mn or Li causes a semiconductivity starting temperature of the composition to be lowered and an increase in $TiO_2$ permits its resistance to be adjusted without significantly varying its temperature coefficients $\alpha$ and $-\alpha$.

Addition of M other than Li and Mn exhibits like advantages.

Specimens Nos. 13 to 16 indicate advantages due to combined addition of $SiO_2$ and M while keeping the amount of $TiO_2$ at a constant level. It will be noted that Mn and Li enhance PTC characteristics and NTC characteristics of the composition, respectively, and addition of $SiO_2$ leads to lowering of the semiconductivity starting temperature. Also, addition of M other than Mn and Li exhibits like advantages.

Specimens Nos. 17 to 24 indicate advantages due to an increase in $TiO_2$ and combined or concurrent addition of $SiO_2$ and M. Mn and Li enhance PTC characteristics and NTC characteristics of the composition, respectively, and addition of $SiO_2$ leads to lowering of the semiconductivity starting temperature. $TiO_2$ permits resistance of the composition to be adjusted. Also, addition of M other than Mn and Li exhibits like advantages.

An experiment proved that a quantitative range of each of SrO, PbO, $Y_2O_3$ and $TiO_2$ in TABLE 4 is substantially the same as that in TABLE 1 irrespective of combined addition of $SiO_2$ and M.

The compositions shown in TABLE 5 each were prepared so as to contain SrO, PbO and $TiO_2$ as a main component wherein a part of each of SrO and PbO is replaced with CaO, BaO or CaO+BaO to cause the composition to exhibit V-type PTC characteristics or CTR characteristics. More particularly, Specimens Nos. 3 to 6, Nos. 10 to 12, Nos. 16 to 18 and Nos. 22 to 24 indicate that addition of CaO or BaO causes the composition to exhibit enhanced PTC characteristics ($\alpha$). Also, it was observed that each of the specimens exhibits a substantially uniform particle size or diameter in the form of a fired element. For example, an analysis of distribution of particle diameter carried out by means of a photograph of a surface of an element obtained by subjecting Sample No. 1 in TABLE 5 to firing revealed that its has an average particle diameter of $13.2\mu$ with a standard deviation of $4.1\mu$, whereas a similar analysis on an element having CaO and BaO added thereto indicates a standard deviation of $2\mu$ in a similar average particle diameter. Thus, it will be noted that addition of CaO, BaO or CaO+BaO contributes to uniformalizing of the particle size, resulting in reducing a variation of characteristics of the composition.

Figure 5:
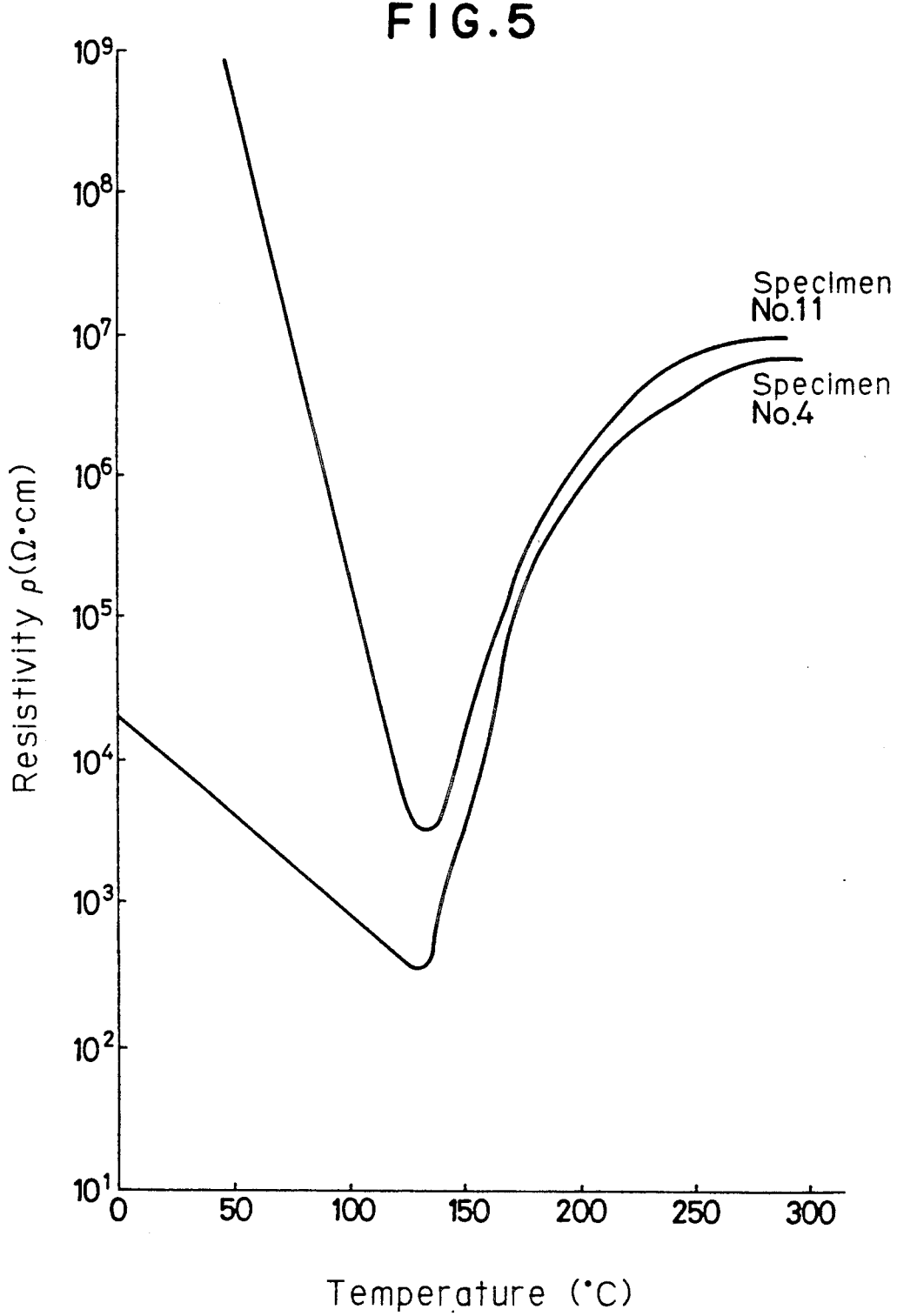

Specimens Nos. 26 and 27 indicate that concurrent or combined addition of CaO and BaO likewise exhibits substantially the same advantage as described above. However, it was found that the advantage is not exhibited at a content of CaO or BaO below 0.0005 mol and the content of 0.3 mol or more causes an increase in resistance to a degree sufficient to render the composition impractical. Also, an experiment revealed that a quantitative range of each of SrO, PbO, $Y_2O_3$ and $TiO_2$ in TABLE 5 is substantially the same as that in TABLE 1 irrespective of concurrent addition of CaO and BaO. FIG. 5 shows relationships between resistivity and a temperature in some representatives of the specimens shown in TABLE 5.

The compositions shown in TABLE 6 each were prepared so as to contain SrO, PbO and $TiO_2$ as a main component and $SiO_2$ and M as a minor component. TABLE 6 indicates that concurrent or combined addition of $SiO_2$ and M exhibits a combination of advantages obtained by adding the components independent from each other. In TABLE 6, CaO is added to all specimens, resulting in the PTC characteristics being somewhat enhanced and the grain or particle size being rendered uniform. To the compositions of Specimens Nos. 8 to 10, 12, 14 and 30 to 33 is added only M. It will be noted that Mn increases a temperature coefficient $-\alpha$ of the composition and enhances the NTC characteristics. The test results on the compositions of Specimens Nos. 5 and 7 indicate that an increase in amount of $TiO_2$ permits the resistance to be adjusted. Specimens Nos. 1, 3, 28 and 29 indicate that addition of $SiO_2$ causes a semiconductivity starting temperature of the composition to be lowered and Specimens Nos. 2 and 4 indicate that addition of $SiO_2$ lowers the semiconductivity starting temperature and an increase in $TiO_2$ permits adjustment or control of the resistance.

Also, in TABLE 6, Specimens Nos. 9, 11, 13 and 15 reveal advantages due to an increase in $TiO_2$ and addition of M. More specifically, Mn and Li contribute to enhancement of the PTC characteristics and NTC characteristics, respectively, and $TiO_2$ permits adjustment of the resistance. It was found that M other than Mn and Li exhibits substantially the same advantage. Specimens Nos. 16 to 20, 22, 24 and 26 indicate test results of combined addition of $SiO_2$ and M. It will be noted that Mn and Li enhance the PTC characteristics and NTC characteristics respectively, and $SiO_2$ contributes to lowering of the semiconductivity starting temperature. Specimens Nos. 21, 23, 25 and 27 reveals advantages due to an increase in $TiO_2$ and combined addition of $SiO_2$ and M. Mn and Li enhance the PTC characteristics and NTC characteristics, $SiO_2$ contributes to lowering of the semiconductivity starting temperature, and an increase in $TiO_2$ permits adjustment of the resistance. Addition of M other than Mn and Li exhibits substantially the same advantage. Also, it was found that this is true of addition of BaO in place of CaO or concurrent addition of BaO and CaO.

Also, it was confirmed by an experiment that a quantitative range of each of SrO, PbO, $Y_2O_3$ and $TiO_2$ in TABLE 6 is substantially the same as that in TABLE 1 irrespective of combined addition of $SiO_2$ and M.

As can be seen from the foregoing, in the semiconductive ceramic composition of the present invention which contains a main component consisting of SrO, PbO and $TiO_2$, a variation of $TiO_2$ permits specific resistance or resistivity of the composition to be varied without significantly varying the resistance-temperature characteristics. Also, addition of $SiO_2$ permits the semiconductivity starting temperature to be decreased by 20° to 50° C., resulting in improving sintering of the composition and facilitating manufacturing of the composition. $SiO_2$ in an amount below 2.0 wt% causes the composition to exhibit V-type PTC characteristics and the addition in amount of 2.0 wt% or more leads to change of characteristics of the composition from NTC characteristics to characteristics approaching to CTR characteristics. Also, the composition of the present invention has an advantage capable of substantially moving a point at which resistance is suddenly varied, as compared with the prior art which merely causes slight movement of the point. Also, a variation in addition of $SiO_2$ and $Y_2O_3$ causes characteristics of the composition to be varied as desired. More particularly, it permits characteristics of the composition to be changed from PTC characteristics to V-type PTC characteristics and further to characteristics approaching to CTR characteristics.

Addition of Ca or Ba renders a particle side of the composition substantially uniform, resulting in masspro- duction of the composition stable in quality and free of a variation in characteristics. Addition of M which is an impurity contributes to control and improvement of various characteristics of the composition. For example, addition of at least one of Mn, Cu, Cr, Ni, Ce, Fe, Co, Ru, Os, Ge, Hf, P, Sb, V, Mg and Zn contributes to an improvement in rise of PTC characteristics and addition of at least one of W, Al, Mo, In, Ga, Nb, Ta, Bi, Sc, rare earth elements (except Ce), Th, Na, K, Li, B, Ag, Cs and Rb renders a gradient of NTC characteristics steep.

Thus, it will be noted that the semiconductive ceramic composition of the present invention exhibits various kinds of resistance-temperature characteristics and is readily manufactured on a large scale.

While the present invention has been described with a certain degree of particularity with reference to the example and drawings, obvious modifications and variations are possible in the light of the above teachings. It is therefore to be understood that within the scope of the appended claims, the invention may be practiced otherwise than as specifically described.

What is Claimed is:

1. A semiconductive ceramic composition comprising Sr of 0.05 to 0.95 mol based on SrO, Pb of 0.05 to 0.85 mol based on PbO, Ti of 0.90 to 2.0 mol based on $TiO_2$ and R of 0.001 to 0.3 mol based on its oxide, wherein R is at least one material selected from the group consisting of rare earth elements, Bi, V, W, Ta, Nb and Sb, and the amounts of Bi, Sb and rare earth elements except Ce, are based on $\frac{1}{2}(R_2O_3)$, the amounts of V, Ta and Nb are based on $\frac{1}{2}(R_2O_5)$ and the amounts of Ce and W are based on $RO_2$ and $RO_3$, respectively, and subjected to firing in an oxidizing atmosphere.

2. A semiconductive ceramic composition as defined in claim 1 further comprising $SiO_2$ added in an amount of 0.001 to 30 wt%.

3. A semiconductive ceramic composition as defined in claim 1 further comprising $SiO_2$ added in an amount of 0.001 to 30 wt% and M;
said M being at least one material selected from the group consisting of Mn, Cu, Cr, Ni, Fe, Co, Ru, Os, Ge, Hf, P, Sb, V, Mg, Zn, W, Al, Mo, In, Ga, Nb, Ta, Bi, Sc, rare earth elements, Th, Na, K, Li, B, Ag, Cs and Rb;
said M being added in amounts of 0.00001 to 1.2 wt% except Al and W;
Al and W being added in amounts of 0.00001 to 8 wt%.

4. A semiconductive ceramic composition as defined in claim 1, wherein SrO and PbO in amounts of 0.001 to 0.3 mol are replaced with at least one of BaO and CaO.

5. A semiconductive ceramic composition as defined in claim 4 further comprising $SiO_2$ added in an amount of 0.001 to 30 wt%.

6. A semiconductive ceramic composition as defined in claim 4 further comprising M;
said M being at least one material selected from the group consisting of Mn, Cu, Cr, Ni, Fe, Co, Ru, Os, Ge, Hf, P, Sb, V, Mg, Zn, W, Al, Mo, In, Ga, Nb, Ta, Bi, Sc, rare earth elements, Th, Na, K, Li, B, Ag, Cs and Rb;
said M being added in amounts of 0.00001 to 1.2 wt% except Al and W;
Al and W being added in amounts of 0.00001 to 8 wt%.

7. A semiconductive ceramic composition as defined in claim 4 further comprising $SiO_2$ added in an amount of 0.001 to 30 wt% and M;
said M being at least one material selected from the group consisting of Mn, Cu, Cr, Ni, Fe, Co, Ru, Os, Ge, Hf, P, Sb, V, Mg, Zn, W, Al, Mo, In, Ga, Nb, Ta, Bi, Sc, rare earth elements, Th, Na, K, Li, B, Ag, Cs and Rb;
said M being added in amounts of 0.00001 to 1.2 wt% except Al and W;

Al and W being added in amounts of 0.00001 to 8 wt%.

8. A semiconductor ceramic composition comprising:
Sr in the amount of 0.05 to 0.95 mol based on SrO, Pb in the amount of 0.05 to 0.85 mol based on PbO, Ti in the amount of 0.90 to 2.0 mol based on $TiO_2$, and R in the amount of 0.001 to 0.3 mol based on its oxide, wherein R is at least one material selected from a group consisting of rare earth elements, V, Ta, Nb, Sb, and Bi, wherein the amount of the rare earth element except for Ce and the amount of Sb and Bi are based on $\frac{1}{2}(R_2O_3)$, the amounts of V, Ta and Nb are based on $\frac{1}{2}(R_2O_5)$, the amount of Ce is based on $RO_2$, and the amount of W is based on $RO_3$, the above elements of the composition are mixed with an additive M before firing in an oxidizing atmosphere to produce the semiconductor ceramic composition, wherein M is selected from a group consisting of Mn, Cu, Cr, Ni, Fe, Co, Ru, Os, Ge, Hf, P, Sb, V, Mg, Zn, W, Al, Mo, In, Ga, Nb, Ta, Bi, Sc, rare earth elements, Th, Na, K, Li, B, Ag, Cs, and Rb;

said M being added in amounts of 0.00001 to 1.2 wt% except for Al and W, and Al and W being added in amounts of 0.00001 to 8 wt%.

9. A semiconductive ceramic composition as defined in claim 8, wherein SrO and PbO in amounts of 0.001 to 0.3 mol are replaced with at least one of BaO and CaO.

10. A semiconductive ceramic composition as defined in claim 8 further comprising $SiO_2$ added in an amount of 0.001 to 30 wt%.

* * * * *